United States Patent

[11] 3,570,576

[72] Inventor Henri Griffon
 2, Place Mazas, Paris 12 eme, France
[21] Appl. No. 852,014
[22] Filed Aug. 21, 1969
[45] Patented Mar. 16, 1971
[32] Priority Aug. 22, 1968
[33] France
[31] 163832

[54] CONTINUOUS DEHYDRATION APPARATUS
 10 Claims, 7 Drawing Figs.
[52] U.S. Cl. ................................................. 159/8,
 99/199, 34/208, 34/217
[51] Int. Cl. ................................................. B01d 1/14
[50] Field of Search .................................... 159/7, 8,
 12, 49; 34/203, 205, 208, 217, 227, 230, 232, 233,
 31, 34, 161, 210, 211, 215, 216, 218; 99/199

[56] References Cited
 UNITED STATES PATENTS
1,286,538 12/1918 Coleman .................. 159/7
1,562,761 11/1925 Harris ....................... 159/8
1,744,884 1/1930 Greiner ..................... 34/203X
2,235,324 3/1941 Moreland .................. 18/55
2,419,876 4/1947 Birdseye .................... 34/203X
3,210,260 10/1965 Denker et al. ............. 159/7X Primary Examiner—Wilbur L. Bascomb, Jr.
Assistant Examiner—J. Sofer
Attorneys—Dean Laurence and A. David Spevack ABSTRACT: Apparatus for dehydrating foodstuffs of a creamy or pasty consistency having elongate upper and lower compartments through which an endless conveyor belt passes, the foodstuff being dried with air which flows countercurrently with the conveyor belt in the upper compartment, where a layer of the foodstuff to be dehydrated is deposited on the outer surface of the conveyor belt, and which flows concurrently with the conveyor belt in the lower compartment, where the dehydrated foodstuff is removed from the conveyor belt, the conveyor belt being supported in the upper compartment by rollers positioned below the conveyor belt which contact its inner surface and in the lower compartment by rotatable disks positioned below the conveyor belt which contact the outer surface thereof bearing the layer of foodstuff thereon.

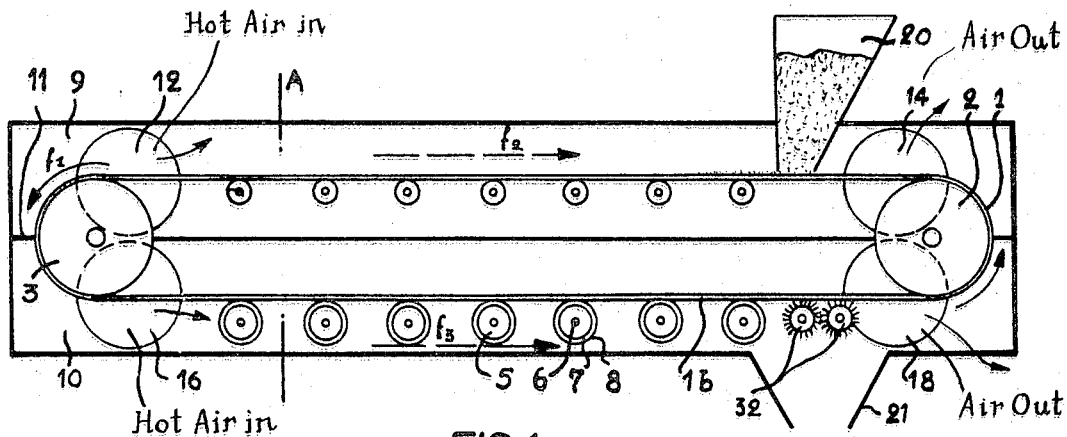
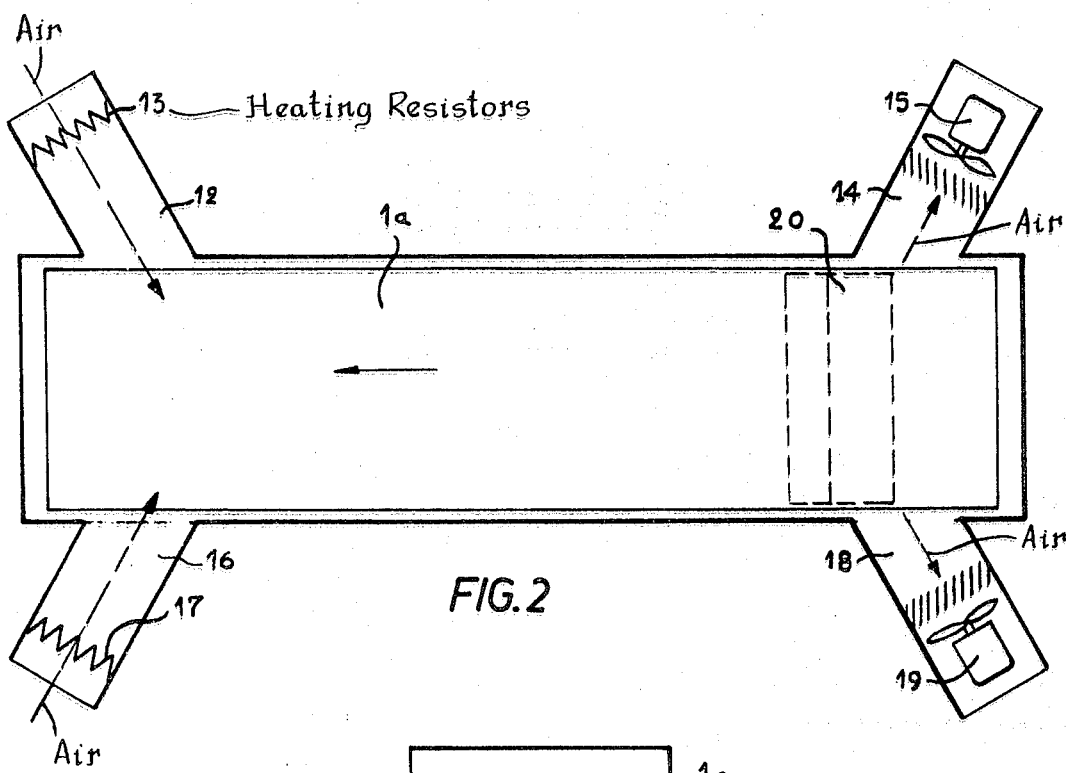
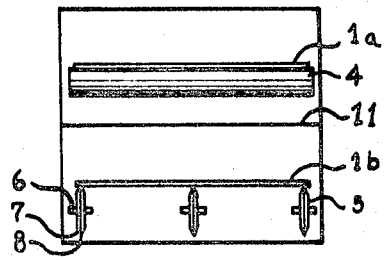

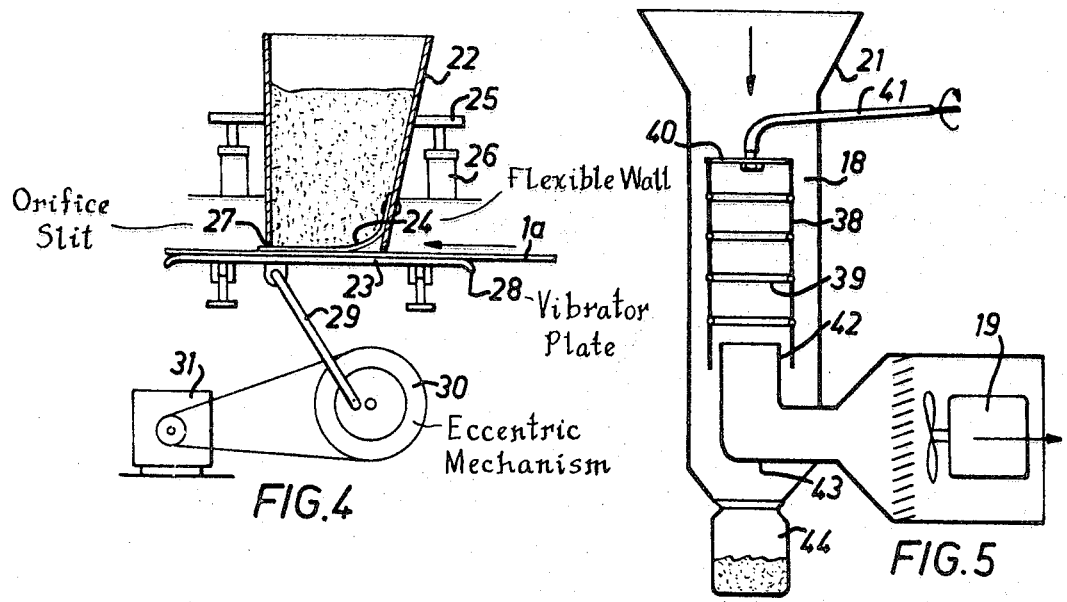
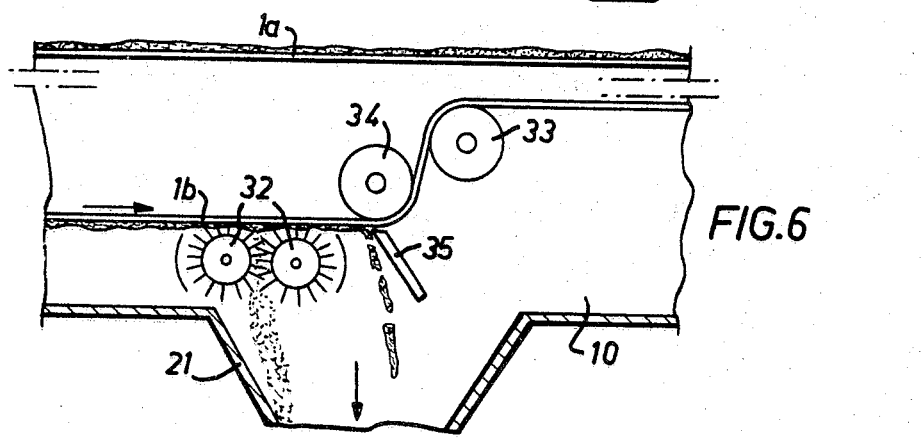
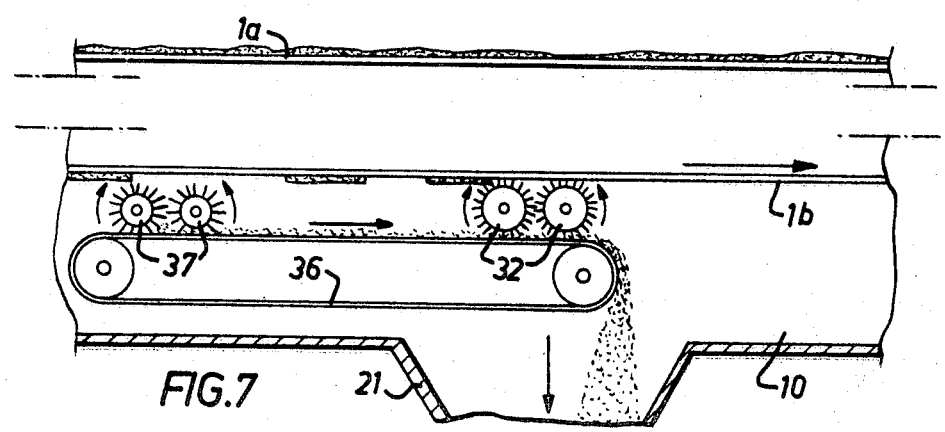

CONTINUOUS DEHYDRATION APPARATUS

BACKGROUND OF INVENTION

This invention relates to a novel apparatus for the dehydration of materials, more particularly for the continuous dehydration of creamy or pasty foodstuffs with a current of heated air.

A continuous process for the dehydration of pasty or creamy foodstuffs at relatively low temperatures, e.g., up to 37° C., is claimed in my U.S. Pat. No. 3,431,119. An apparatus for performing such a process using a continuous conveyor belt on which a continuous film of the foodstuff is spread is claimed in my U.S. Pat. No. 3,266,558. The present invention is an improved apparatus for performing the above-described process.

SUMMARY OF INVENTION

According to this invention, there is provided a continuous conveyor belt, onto which the foodstuff to be dehydrated is spread which moves in an enclosure having a first compartment enclosing the upper web of the conveyor belt and a second compartment below the former, enclosing the lower web of the conveyor belt. Exhaust means is provided which causes heated air to move in both compartments from one end to the other, in a direction countercurrent to the movement of the conveyor belt in the first compartment and in a direction concurrent with the movement of the conveyor in the second compartment. Heating means is provided which heats the air prior to its entrance into the compartments. Spreading means is provided for applying a continuous layer of the foodstuff to be dehydrated onto the outer surface of the web of the conveyor as it enters the upper compartment and preferably means is provided for the removal of the dehydrated foodstuff from the web of the conveyor belt, before it leaves the lower compartment and reenters the upper compartment.

DETAILED DESCRIPTION OF INVENTION

By way of example, and to facilitate an understanding of the invention, reference is made to the drawings in which:

FIG. 1 is a schematic side view, in section, of an embodiment of the machine of the invention;

FIG. 2 is a schematic plan view, with partial section of FIG. 1;

FIG. 3 is a view in section along A-A of FIG. 1;

FIG. 4 is a detail view on an enlarged scale of the loading hopper of the device of FIG. 1;

FIG. 5 is a detail view on an enlarged scale of a device for recovering the dehydrated material; and FIGS. 6 and 7 are detail views on an enlarged scale of a device for separating the dehydrated material from the conveyor surface.

With reference to these FIGS., as shown in FIG. 1 the machine comprises an endless conveyor belt 1 positioned between two mounting rolls 2 and 3, one of which is driven by driving means, not shown. As shown in FIGS. 1 and 3, the upper part 1a of belt 1 is supported by a plurality of rollers 4 which contact the inner surface of belt 1, while the lower part 1b of belt 1 is supported by a plurality of rotatable discs 5 which are mounted in groups of three on shafts 6. Each of discs 5 has a peripheral bevel 7 so that it contacts the outer surface of belt 1 only along its circumferential edge 8. Rolls 4 and discs 5 support belt 1 so that the belt need not be stretched by mounting rolls 2 and 3 to prevent it from sagging, which arrangement also avoids deformation and deterioration of the belt.

The upper half 1a of belt 1 moves in an upper compartment 9 while its lower half 1b moves in a separate compartment 10 positioned below compartment 9. The two compartments are separated by a partition 11.

As shown in FIGS. 1 and 2, the upper compartment 9 has an air intake 12, with a plurality of heating resistors 13 mounted therein for heating the intake air, and has an air exhaust outlet 14 with a suction fan 15 mounted therein which draws a current of air through air inlet 12 and the upper compartment 9. Openings 12 and 14 are positioned so that the circulation of air caused by fan 15 moves countercurrent to the direction of travel of the upper half 1a of belt 1. Thus, in the apparatus shown in FIG. 1, belt 1 moves counterclockwise, as indicated by arrow $f_1$, with upper part 1a moving from right to left and the stream of air moving from left to right, as shown by arrow $f_2$.

Similarly, lower compartment 10 has an air intake 16 with a plurality of heating resistors 17 mounted therein for heating the intake air and an air exhaust outlet 18 provided with an exhaust fan 19. Intake 16 and outlet 18 are positioned so that the movement of air caused by fan 19 is concurrent with the direction of travel of belt 1b, so that belt 1 moves counterclockwise, as indicated by arrow $f_1$ in FIG. 1, with lower part 1b moving from left to right and the stream of air moving from left to right, as shown by arrow $f_3$.

Proximate the point of entrance of belt 1 into upper compartment 1 there is provided a hopper 20 which feeds a continuous layer of the material to be dehydrated onto the outer surface of belt 1. Proximate the point of exit of belt 1 from the lower compartment 10 there is provided a collection chute 21 which collects the dried product after it is removed from the lower half 1b of belt 1 by brushes 32.

The hopper 20 for loading the material to be dehydrated comprises at its base a rectangular opening in a plane parallel to the plane of the conveyor, the size of which opening and the height of the hopper 20 above the upper half 1a of belt 1 being adjustable, as described hereinafter.

FIG. 4 shows in a detailed manner the feed hopper 20 shown in FIG. 1. It comprises a receptacle 22 in the form of an inverted truncated pyramid, which presents a rectangular opening 23 at its lower end, which opening is in a plane parallel to and proximate the outer surface of belt 1a. Opening 23 is partly closed by a flexible wall 24 which is attached by one end only to the inner surface of upstream wall of receptacle 22, which is supported by elements 25 having adjusting means 26 for varying the height of receptacle 22 above the outer surface of the upper half of 1a of belt 1 and thus the space separating opening 23 from belt 1. Adjusting the height of receptacle 22 has the effect of varying the narrow longitudinal orifice 27 between the end of flexible wall 24 and the lower edge of the downstream wall of receptacle 22.

For handling materials which do not flow easily, a vibrator plate 28 is placed directly under receptacle 22 and below the upper half 1a of belt 1. It is connected by a link 29 to an eccentric mechanism 30 driven by a motor 31. The vibration of plate 28 is transmitted to belt 1a and hence to flexible wall 24, which facilitates a regular flow of the material from receptacle 22 onto belt 1, which preferably is as constant as possible.

FIGS. 1, 6 and 7 show alternate methods for collecting the dehydrated material transported to lower chamber 10 by lower half 1b of belt 1. In the embodiment shown in FIG. 1, two brushes 32 are used which turn in opposite directions toward each other.

The alternate device illustrated in FIG. 6 comprises, in addition to the two brushes 32, a static or dynamic scraper 35 which removes by scraping dehydrated material left by brushes 32. Scraper 35 is assisted by two rollers 33 and 34, deposed on either side of web 1b at different levels, which causes belt 1 to follow a twisting path and travel in opposite directions.

The alternate device shown in FIG. 7 comprises an auxiliary conveyor belt 36 surmounted at its upstream end by a set of counter rotary brushes 37 and at its downstream end by a set of brushes 32. Brushes 37 preferably are not in contact with the surface of web 1b whereas brushes 32 are in contact therewith.

The stream of air exiting from compartment 10 through collection chute 21 is charged with dehydrated material and can be separated therefrom by a battery of conventional cyclone separators, not shown, or preferably as shown in FIG. 5, is separated by a filter mounted in the vertical axis of exit 18, which comprises a cylindrical filter sleeve 38 mounted on a frame 39 fixed to a rotating disc 40 which is rotated by a driven sheathed cable 41. Projecting into the opening at the lower end of the filter is the end 42 of a conduit 43 in which is mounted an exhaust fan 19. At the lower end of passage 18 there is mounted a removable collection receptacle 44. The particles entrained by the flow of air are removed by the filter 38 and the filtered air is then exhausted through conduit 43. The particles are removed from the airstream by striking rotating disc 40, whose movement projects the particles by centrifugal force against the walls of passage 18, where they then fall into receptacle 44.

In operation, material to be dehydrated in hopper 20 flows through orifice 27 and is deposited on the outer surface of upper half 1a of belt 1 in a continuous layer of uniform thickness. Belt 1, with the layer of material to be dehydrated on its outer surface, moves through upper compartment 9 toward mounting roller 3 and air intake 12. The current of heated air travelling from air intake 12 to the air exhaust outlet 14 countercurrent to the direction of travel of upper half 1a of belt 1 gradually warms the layer of material on the surface thereof and evaporates water therefrom.

Belt 1 then passes from upper compartment 9 into lower compartment 10, where the heated layer of material is exposed to a current of heated air-from-air intake 16 travelling concurrently with the lower half 1b of belt 1.

It is to be noted that both the upper half 1a and lower half 1b of belt 1 are used in the dehydration operation, which provides twice the drying path of conventional dehydration equipment which employs a conveyor drying belt. Also, because the direction of flow of the current of heated air is concurrent with the direction of travel of belt 1 and hence to the product disposed thereon in compartment 10 and countercurrent therewith in compartment 9, the product is gradually heated to its maximum temperature near roll 3 and is then gradually cooled, so that at 21 it is at a temperature fairly close to room temperature. This gradual rise in temperature followed by a gradual cooling avoids any deterioration of the organoleptic properties of products of biological origin, which would be produced by sudden changes of temperature.

Moreover, because the air circulation is produced by exhaust fans 15 and 19, a slight vacuum is produced inside the two compartments 9 and 10, which accelerates the evaporation process although the vacuum is slight and thus has no harmful effect on the organoleptic properties of the materials.

The various parameters, e.g., speed of travel of belt 1, rate and amount of air flow and temperatures of the air flows, can be adjusted as desired by any suitable known means. For each type of material to be dehydrated and depending upon the water content thereof, the adjustment of these parameters is effected so that the temperature of the material remains below 38—40° C. throughout the time of residence in the apparatus. For materials which have undergone preliminary cooking, it is possible to use a higher heat, without however, ordinarily going beyond 60° C.

Experiments have shown that creamy or pasty materials which are dehydrated can be classified in three main categories when they become dehydrated sufficiently to be classifiable as dry, i.e., with a residual water content of 3 to 6 percent.

Those in the first category are spongy and crumbly, and cling only lightly to the surface of the lower half 1b of belt 1. In this case the material can be readily detached therefrom by brushes, as shown in FIG. 1.

Those in the second category form a microporous coating of a hard, somewhat vitreous consistency. These appear to cling rather firmly to the surface of belt 1 but in fact crack off rather easily and can be removed using the embodiment shown in FIG. 6.

Those in the third category loosen spontaneously from the surface of belt 1 as soon as they are dry. In this case the temperature and air flow through the first compartment 9 are regulated so that this condition is reached only in lower compartment 10, where the air moving in the same direction as web 1b, can entrain the material coming loose from the web and carry it to collection chute 21. Those in this category are preferably dehydrated using the device shown in FIG. 7.

I claim:

1. Apparatus for dehydrating creamy and pasty materials comprising:
   a. a substantially closed elongate drying chamber divided horizontally into:
      i. an upper compartment and;
      ii. a lower compartment, which compartments are separated by;
      iii. a horizontal partition having an opening at each end thereof providing communication between the upper and lower compartments;
   the compartments having means for moving respective concurrently flowing streams of heated air therethrough comprising;
      iv. respective air inlets proximate the same ends of the compartments, each inlet comprising means for supplying heated air to the respective compartments;
      v. respective air outlets proximate the opposite ends of the compartments, each outlet comprising means for exhausting air from the respective compartments;
   b. an endless driven conveyor belt, mounted on a pair of mounting rolls, each roll positioned in one of the openings in the partition, so that the upper half of the conveyor belt is positioned in the upper compartment and the lower half of the conveyor is positioned in the lower compartment, with the outer surface of the conveyor belt being formed of a material to which the layer of material to be dehydrated thereon adheres as it travels in both compartments;
   c. feed means in the upper compartment positioned proximate the air outlet of the upper compartment for distributing a layer of the material to be dehydrated onto the uppermost surface of the conveyor belt;
   d. collection means in the lower compartment positioned proximate the air outlet end of the lower compartment for collecting dehydrated material removed from the lowermost surface of the conveyor belt;
   e. means for transferring dehydrated material from the conveyor belt to the collection means; and
   f. driving means for driving the conveyor belt in a direction toward the air inlet end of the upper compartment and toward the air outlet end of the lower compartment.

2. Apparatus according to claim 1, comprising a plurality of guide rollers in the upper chamber between the mounting rolls which contact the inner surface of the conveyor belt and provide support for the conveyor belt during its travel in the upper compartment, an a plurality of thin-edged rotatable discs positioned in the lower chamber below the belt between the mounting rolls which discs contact the lowermost surface of the conveyor belt with their peripheral edges and provide support for the conveyor belt during its travel in the lower compartment.

3. Apparatus according to claim 1, comprising a loading hopper for the material to be dehydrated which presents at its base a rectangular opening in a plane parallel to the plane of the conveyor belt, the opening being partly obturated by a flexible wall, fixed at its upper end to the upstream side of the said opening with regard to belt movement, with its lower portion resting on the surface of the conveyor belt and extending in the downstream direction.

4. Apparatus according to claim 3, wherein the loading hopper is adjustably mounted by means which permit adjustment of the distance between the opening at its base and the surface of the conveyor belt.

5. Apparatus according to claim 3, comprising a vibrator plate, positioned under the conveyor belt directly below the hopper opening at its base, which vibrates the portion of the belt below the hopper.

6. Apparatus according to claim 1, comprising a plurality of brushes, positioned in the lower compartment below the conveyor belt and in contact with its outer surface, and which rotate in opposite directions, for detaching dried material from the surface of the conveyor belt.

7. Apparatus according to claim 1, comprising a pair of rollers, positioned in the lower compartment on opposite sides of the lower run of the belt and at different levels, which produce a double twist in the path of the belt in the lower compartment, for detaching dried material from the surface of the conveyor belt.

8. Apparatus according to claim 1, comprising an auxiliary horizontal conveyor, positioned in the lower compartment below the conveyor belt for conveying dried material detached from the conveyor belt to the collection means.

9. Apparatus according to claim 8, comprising a plurality of brushes mounted below the conveyor belt and above the auxiliary conveyor and in contact with the uppermost surface of the auxiliary belt and in contact with the lowermost surface of the conveyor belt, which rotate in opposite directions, for detaching dried material from the surface of the conveyor belt.

10. Apparatus according to claim 1, wherein the dehydrated material in the airstream which exhausts from the lower compartment is separated therefrom by a rotary filter having a hollow vertical shaft, inside of which is mounted the end of a conduit connected to an exhaust fan which